United States Patent [19]

Kubo

[11] Patent Number: 4,524,959
[45] Date of Patent: Jun. 25, 1985

[54] HOLDER OF PIPES OR PIPE JOINTS FOR WELDING

[76] Inventor: Tetsushi Kubo, 861, Hirata, Ichihara-shi, Chiba-ken, Japan

[21] Appl. No.: 526,114

[22] Filed: Aug. 24, 1983

[30] Foreign Application Priority Data

Aug. 25, 1982 [JP] Japan .............................. 57-128418[U]

[51] Int. Cl.³ .............................................. B23K 1/14
[52] U.S. Cl. ...................................... 269/43; 269/156; 269/239
[58] Field of Search .......... 269/43, 156, 152, 237–239; 29/237, 238; 228/49 B, 44.1, 47

[56] References Cited

U.S. PATENT DOCUMENTS

| 57,447 | 8/1866 | Stockmar | 269/238 |
| 848,036 | 3/1907 | Kruger | 269/156 |
| 1,709,385 | 4/1929 | Young | 269/156 |
| 1,947,607 | 2/1934 | Marogg | 269/239 |
| 2,416,228 | 2/1947 | Sheppard | 269/156 |
| 3,666,159 | 5/1972 | Watson | 269/43 |
| 4,378,937 | 4/1983 | Dearman | 269/43 |

Primary Examiner—Robert C. Watson
Attorney, Agent, or Firm—Toren, McGeady, Stanger

[57] ABSTRACT

A holder for use in holding two pipes or pipe joints to be welded where one of the pipes or pipe joints is held by three pipe abutting members mounted in angularly spaced relation on a common holder with the position of the pipe abutting members being adjustable by a screw bar. The other pipe or pipe joint is held by means of three supporting screw bars adjustably mounted in the pipe abutting members. With this holder the facing end portions of the pipes or pipe joints maintain the groove abutting condition and the centering condition. The holder is easily positioned on the pipes or pipe joints for performing the welding operation.

4 Claims, 14 Drawing Figures

HOLDER OF PIPES OR PIPE JOINTS FOR WELDING

BACKGROUND OF THE INVENTION

This invention relates to a holder of pipes or pipe joints for welding, which can hold the root opening of the pipes or the pipe joints uniform in the case of butting the end portions of pipes or pipe joints.

Generally, in welding of pipes or pipe joints on the pipe assembly works, there has been used welding means of one side butting from outside. The end portions of pipes or pipe joints to be welded are provided with welding grooves respectively, and the groove angle, root opening, etc. in the welding groove are determined according to pipe thickness and welding methods.

The condition of welding groove gives an important influence to the welding result, so that the pipe ends must be carefully worked so as to be smooth and clean.

Further, it is important that pipe ends are aligned, that dislocation between both pipes is prevented by centering, and that the root opening is kept uniform.

Figure 1:
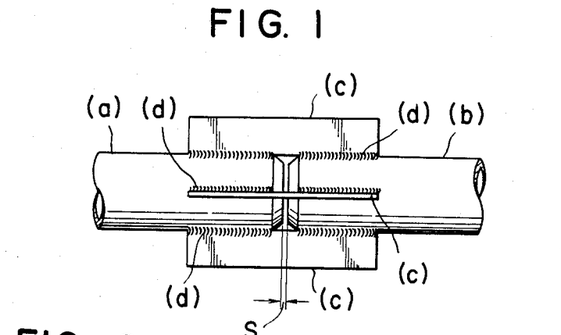
FIG. 1 is a side view of an essential part showing conventional step of welding pipe end portions.

In order to satisfy the above-mentioned important conditions and also hold securely the pipes to be welded, many kinds of external clamps have been employed. However, as these external clamps have complicated mechanisms and are of large size, there existed inconvenience in case of pipe assembly works, such as difficulty in handling. Therefore, as shown in FIG. 1 tack steel plates (c) have been used so that the groove butting condition of the pipes (a) and (b) is held. These tack steel plates are welded at the equal distance in the outer periphery of the pipes, in which the welding operation is made between the pipes (a) and (b) while keeping the root opening (s). The welding of the tack steel plates is made as a preparation work of the pipe assembly works.

Nextly, in the place in which the welding of the tack steel plates finished, the groove portion is welded in the state that the tack steel plates have been welded, and then the tack steel plates are knocked and removed by a hammer, and thereafter the portion of groove which has not yet been welded is welded, and finally the remains of welded metal of the tack steel plate are made flat by a grinder.

The conventional methods as mentioned above cause often such defects that pipes are damaged due to removal of tack steel plates by a hammer and that the remedy of such damage is necessitated by means of a build-up welding and also cracks on the pipes are sometimes found according to the X-ray research.

SUMMARY OF THE INVENTION

This invention is to provide a holder of pipes or pipe joints for welding which can hold the groove butting condition easily and securely without the welding work of the tack steel plates.

The object of this invention is to provide the holder which can assemble exactly piping by holding the pipes or pipe joints successively without relying on skilled workers.

Another object of this invention is to provide the holder by which the facing and holding of the groove portions of the respective pipes or the pipe-centering can be effected speedily.

Further object of this invention is that the pipe-assembly can be effected with the higher efficiency by using the holder according to this invention.

DETAILED DESCRIPTION OF THE INVENTION

An example of the present invention will now be described referring to the drawings.

Referring to FIGS. 2 through 6, the holder 1 according to this invention comprises a supporting member 2; a screw bar 4 the male threaded portion 4a of which is engaged with the threaded hole 3 passing through the central portion of the supporting member 2; a mounting member 5 mounted at the lower end of the screw bar 4 and movable upwardly or downwardly by turning of the screw bar 4; a pipe abutting member 6 provided on the mounting member 5; a left arm member 8 curved inwardly, and the top end of which is pivoted on the supporting member 2 through a pin 7; a right arm member 10 curved inwardly, and the top end of which is pivoted on the supporting member 2 through a pin 9; a left link member 13, one end of which is pivoted on one end portion of the mounting member 5 through a pin 11, while the other end is pivoted on the left arm member 8 through a pin 12; a right link member 16, one end of which is pivoted on the end portion of the mounting member 5 through a pin 14, while the other end is pivoted on the upper portion of the left arm member 10; a pipe abutting member 17 provided on the lower end of the left arm member 8; a pipe abutting member 18 provided on the lower end of the right arm member 10; and pipe supporting screw bars 22, 23 and 24, the male threaded portions 22a, 23a, and 24a of which are engaged with threaded holes 19, 20 and 21 formed in the pipe abutting members 6, 17 and 18, respectively.

Figure 6:
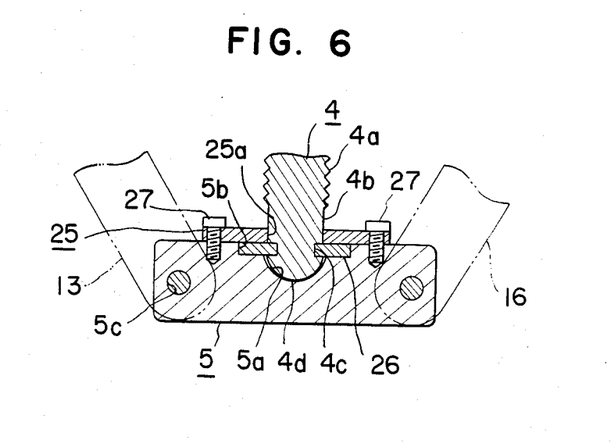
FIG. 6 is a sectional view of essential parts showing a relative construction between the lower end of a screw bar and the mounting member.

In this case, the construction of the mounting member 5 which is mounted at the lower end of the screw bar 4 and moves upwardly or downwardly by turning the screw bar 4 is as shown in FIG. 6.

A columnar portion 4b having a smaller diameter is formed at the lower portion of the male threaded portion 4a of the screw bar 4, and a peripheral groove 4c is formed on the columnar portion 4b. The lower end surface 4d is made to have a semi-spherical form, the lower surface 4d is formed as a semi-sphere and a semi-spherical recess 5a and an annular recess 5b are formed on the upper surface at the central portion of the mounting member 5. The columnar portion 4b is rotatably inserted into the through hole 25a in a holding plate 25. A divided circular piece 26 is fitted in the peripheral groove 4c of the columnar portion 4b of the screw bar 4, and a divided circular piece 26 is loosely fitted in the annular recess 5b and the lower end surface 4d is engaged with the semi-spherical recess 5a, whereby the holding plate 25 is fixed on the upper surface of the mounting member 5 by means of screws 27, 27.

Accordingly, when the screw bar 4 is turned along the vertical threaded hole 3 of the supporting member 2, the mounting member 5 is moved upwardly together with the ascent of the screw bar 4, or is moved downwardly with the descent of the screw bar 4.

The bar portion of a bar handle 28 is loosely passed through a horizontal hole 4f formed in the top portion 4e at the upper end of the screw bar 4, which makes easy to rotate the screw bar 4 through the bar handle 28. Pieces 28a, 28a for preventing falling-off are provided on both ends of the bar handle 28.

Figure 5:
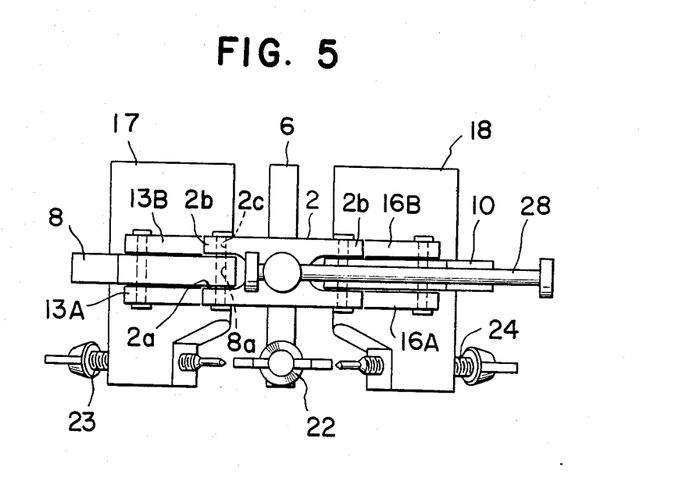
FIG. 5 is a plan view of the same.

In order to pivot the upper end of the left arm member 8 on the supporting member 2 through the pin 7, the upper end of the left arm member 8 is loosely inserted into a vertical groove 2a opened on the end surface of the supporting member 2, as shown in FIG. 5, and the both ends of the pins 7 which have passed through the inserting holes 2c, 2c formed in the supporting portions 2b, 2b on both sides of the vertical fitting groove 2a, and loosely fitted through the through hole 8a at the upper end of the left arm member 8 are fixed to the supporting portions 2b, 2b.

The construction for pivoting the upper end of the right arm member 10 to the other end of the supporting member 2 is the same as in the case of the left arm member 8.

The left link 13 and the right link 16 each connecting the mounting member 5 with the left arm member 8 and the right arm member 10 are so formed as shown in FIGS. 5 and 6, that the left link 13 is formed by a front link 13A and a rear link 13B, and the right link 16 is formed by a front link 16A and a rear link 16B. The end portions of the pin 12 which has passed through the through hole 13a of the front link 13 and loosely fitted into the through hole 8b of the left arm member 8 and passed through the through hole 13b of the rear link 13B are fixed respectively on the front link 13A and the rear link 13B, and the end portions of the pin 11 which has passed through the through hole 13c of the front link 13A, passed through the through hole 5c of the mounting member 5, and passed through the through hole 13d of the rear link 13B are fixed respectively on the front link 13A and rear link 13B to form the side of the left link 13, and the side of the right link 16 is formed similarly to and symmetrically as the side of the left link 13. Thus, by turning the screw bar 4 to move the mounting member 5 upwardly, the lower portions of the left arm member 8 and the right arm member 10 are opened outwardly, through the left link 13 and the right link 16, with the pins 7, 9 as the fulcrums. Similarly, by turning the screw bar 4 to move the mounting member 5 downwardly, the lower portions of the left arm member 8 and right arm member 10 are moved to close inwardly through the left link 13 and the right link 16. Each of the lower portions of the left arm member 8 and right arm member 10 is formed to curve inwardly as viewed in the front elevation.

Figure 2:
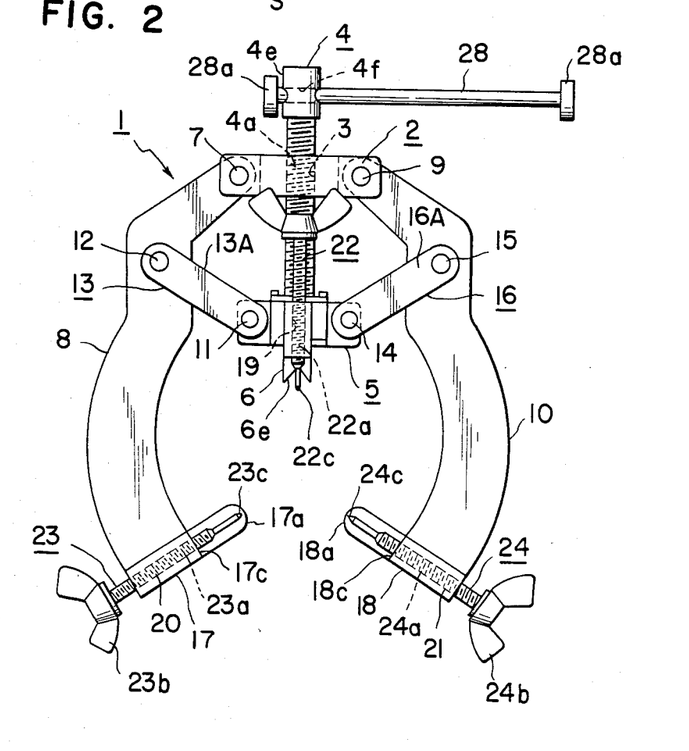
FIG. 2 is a front view of a holder according to the present invention.
Figure 3:
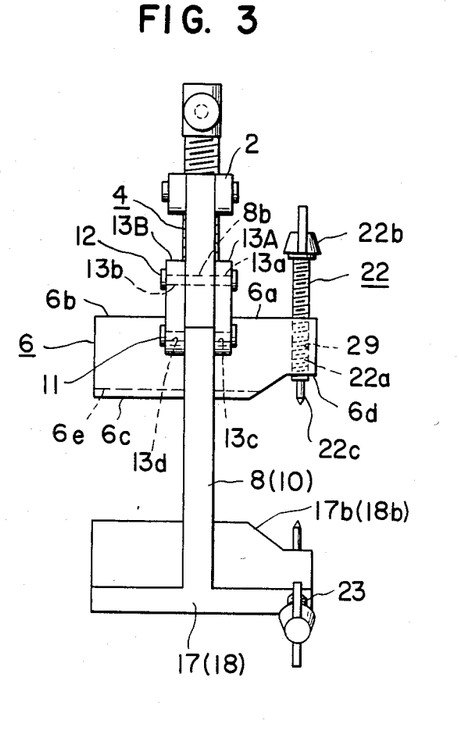
FIG. 3 is a side elevation of the same.

A pipe abutting member 6 in form of a plate is fixed on the mounting member 5 as shown in FIG. 2. The longitudinal direction of the pipe abutting member 6 is perpendicular with respect to the surface in which the left arm member 8 and the right arm member 10 expand and contract as shown in FIG. 3. A mounting portion 6a for pipe supporting bar is formed at the portion projecting forwardly from the front surface of the mounting member 5, and the portion projecting from the rear surface of the mounting member 5 is made to serve as the pipe abutting portion.

The pipe abutting member 6 extends vertically along the axis of the screw bar 4, and the mounting portion 6a for pipe supporting bar is partly cut and removed of its lower portion as seen from the lateral side, so that the level of the lower surface 6d of the mounting portion 6a for the pipe supporting bar is higher than the lower surface 6c of the pipe abutting portion 6b.

Furthermore, a vertical threaded hole 29 is provided in the mounting portion 6a of the pipe abutting member 6, and the male threaded portion 22a of the pipe supporting screw bar 22 is engaged with the vertical threaded hole 29 so as to move the pipe supporting screw bar 22 by a butterfly head portion 22b. The abutting bar portion 22c formed at below the male threaded portion 22a is made to project beyond the lower surface 6d of the mounting portion 6a of the pipe abutting member 6, thus the abutting bar portion 22c is made to move up and down freely.

In addition, the entire length of the lower surface 6c of the pipe abutting portion 6b is formed with an inverted V-shaped groove 6e opening downwardly.

Next, a pipe abutting member 17 is fixed at the lower end of the left arm member 8, and similarly, a pipe abutting member 18 is fixed at the lower end of the right arm member 10.

Referring now to FIG. 2, the pipe abutting member 17 of the left arm member 8 is directed upwardly to right as seen from the front, and the lower end of the left arm member 8 is positioned at the central portion in the longitudinal direction at the upper surface of the pipe abutting member 17, and the entire length in the longitudinal direction of the inner end surface 17a is made to have a curved surface. A threaded hole 20 passing through the pipe abutting member 17 in the widthwise direction is formed in the mounting portion 17b of the pipe abutting member 17 extending to the nearer side of the left arm member 7. The male threaded portion 23a of the pipe supporting screw bar 23 is engaged with the threaded hole 20, the butterfly head portion 23b is placed at the outer end side of the pipe abutting member 17, and the abutting bar portion 23c at the tip end is caused to project beyond the inner end surface 17c of the mounting portion 17b of the pipe abutting member.

Again referring to FIG. 2, the pipe abutting member 18 fixed on the right arm member 10 is directed upwardly to left as seen from the front, the lower end of the left arm member 10 is positioned at the central portion in the longitudinal direction at the upper surface of the pipe abutting member 17, and the entire length in the longitudinal direction of the inner end surface 18a is made to have a curved surface. A threaded hole 21 passing through the pipe abutting member 18 in the widthwise direction is formed in the mounting portion 18b of the pipe abutting member 18 extending to the nearer side of the right arm member 10. The male threaded portion 24a of the pipe abutting member 24 is engaged with the threaded hole 21, the butterfly head portion 24b is placed at the outer end side, and the abutting bar portion 24c at the tip end is caused to project beyond the inner end surface 18c of the mounting portion 18b of the pipe abutting member 18.

The pipe abutting member 6 fixed on the mounting member 5 and extending vertically of its widthwise direction, the pipe abutting member 17 fixed on the left arm member 8 and directed upwardly and obliquely to the right, and the pipe abutting member 18 fixed on the right arm member 10 and directed upwardly and obliquely to the left are disposed in the relation as follows.

Figure 4:
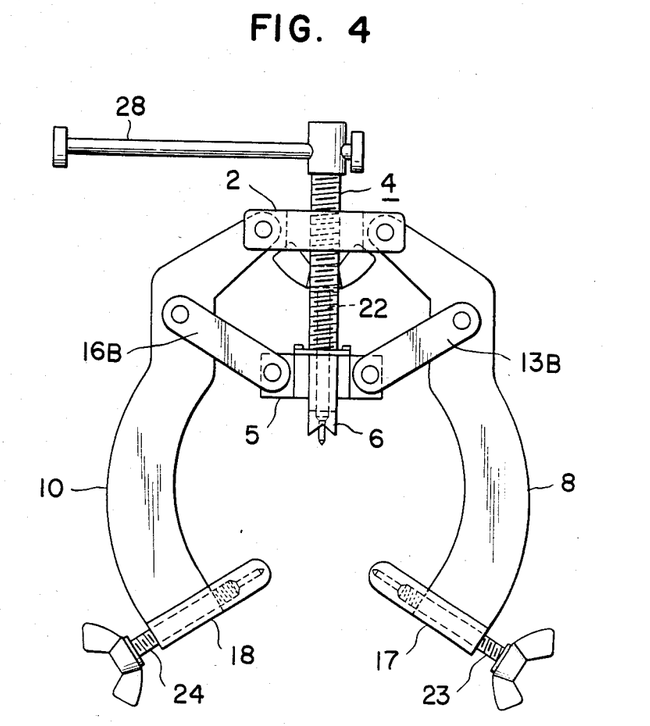
FIG. 4 is a rear view of the same.
Figure 8:
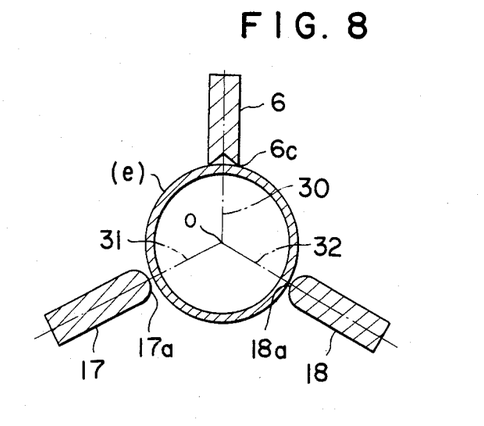
FIG. 8 is a sectional view as seen through a line VIII—VIII in FIG. 7.

Referring to FIG. 8, as viewed in front elevation, the pipe abutting member 17 is situated on the left side with respect to the downward extension of the center line in the front end surface of the pipe abutting member 6, and the pipe abutting member 18 is situated on the right side. Further, the lower end of the pipe abutting portion 6b of the pipe abutting member 6, the inner end surface 17a of the pipe abutting member 17, and the inner end surface 18a of the pipe abutting member 18 have equal lengths and are in parallel and on one and the same concentric circle, respectively. Furthermore, as shown in FIGS. 4 and 8, when viewed from behind, an extension line 30 of the vertical center line of the pipe abutting member 6 and the extension lines 31 and 32 of the center lines in the rear end surfaces of the pipe abutting members 17 and 18 are designed to maintain spacings of approximately 120° with one another, with the point of intersection o as the center.

However, the spacings of 120° will of course be changed more or less in accordance with the state of expansion between the left arm member 8 and the right arm member 10.

Figure 9:
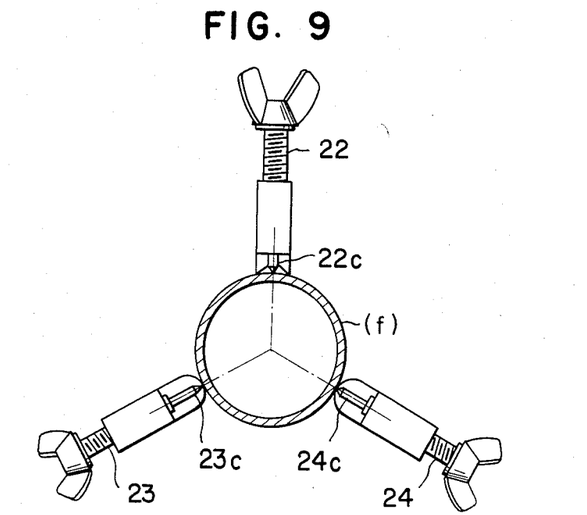
FIG. 9 is a sectional view as seen through a line IX—IX in FIG. 7.

The pipe supporting screw bars 22, 23 and 24 have relative positions of being spaced at about 120° with one another as shown in FIG. 9, but the spacings will be changed more or less in accordance with the state of expansion between the left arm member 8 and the right arm member 10.

The tip ends of the abutting bar portions 22c, 23c and 24c of the pipe supporting screw bars 22, 23 and 24 are formed to have conical pointed ends, respectively.

The holder 1 according to the present invention being constructed as described hereinabove, when the supporting member 2 is held by left hand, and the bar handle 28 is turned counterclockwise by the right hand, the mounting member 5 is moved upwardly together with the screw bar 4 which moves upwardly along the vertical threaded hole 3, as the result, the lower part of the left arm member 8 and the lower part of the right arm member 10 are moved apart gradually in directions to increase the degree of separation while the mounting member 5 is drawing near to the supporting member 2.

When the bar handle 28 is turned clockwisely in the expanded state of the left arm member 8 and the right arm member 10, the mounting member 5 is moved downwardly, together with the screw bar 4 which is descending, and is gradually separating from the supporting member 2, as the result, the lower part of the left arm member 8 and the lower part of the right arm member 10 are moved to approach in directions to decrease the degree of separation.

The reason that the lower part of the left arm member 8 and the lower part of the right arm member 10 are moved in directions to move away approach one another is that each of the upper ends of the left arm member 8 and the right arm member 10 is pivoted to the end portion of the supporting member 2 by the pins 7 and 9, respectively, and that both of the left and right arm members 8 and 10 are operated by the left link 13 and right link 16, each one end of which is pivoted on each of the upper portions of the left arm member 8 and right arm member 10 by means of pin 12 and 15, respectively, while other ends of which are pivoted to the end portions of the mounting member 5 by means of pins 11 and 14, respectively.

The pipe supporting screw bars 23 and 24 move integrally with the left arm member 8 and the right arm member 10.

The pipe supporting screw bars 22, 23 and 24 are provided with the butterfly head portions 22b, 23b and 24b, and are moved along the longitudinal threaded holes 19, 20 and 21 when the butterfly head portions are turned, whereby it is possible to move the abutting bar portions 22c, 23c and 24c in directions toward or away from one another.

The holder 1 according to the present invention is operated as follows.

Figure 7:
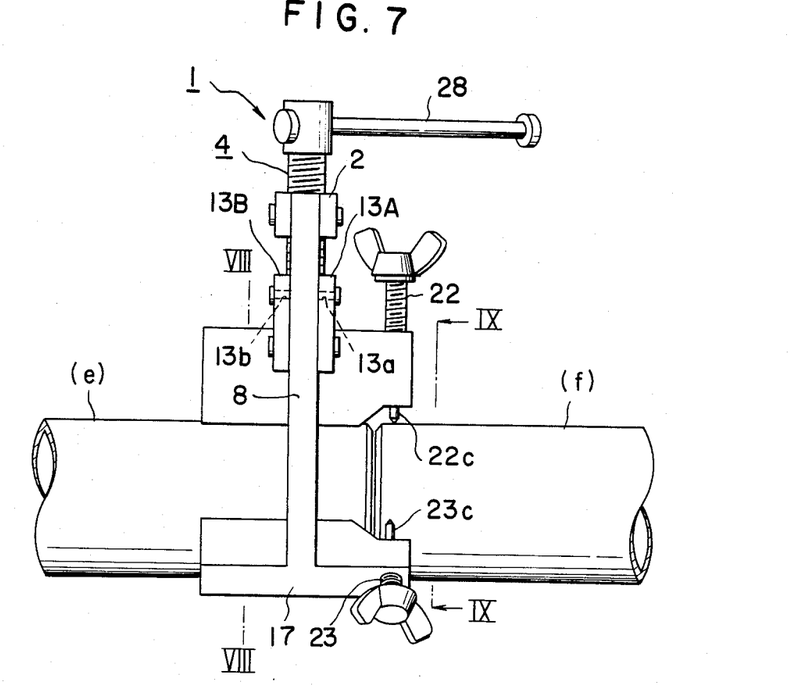
FIG. 7 is a view explaining a case wherein the holder of this invention is used for welding two straight pipes.

FIG. 7 shows a case of facing and holding the groove portions of the respective straight pipes e and f.

It is assumed that the straight pipe f is to be welded to the straight pipe e.

Firstly, the left arm member 8 and the right arm member 10 are expanded suitably to accept the straight pipe 3, so that the outer periphery of the straight pipe e is positioned inside the pipe abutting members 6, 17 and 18. Then, turning the bar handle 28 to cause the pipe abutting members 6, 17 and 18 to come near the outer periphery of the pipe e, and engaging the inner end surfaces 17a and 18a of the pipe abutting portions 17b and 18b of the pipe abutting members 17 and 18 with the outer periphery of the pipe e, after which the holder 1 is tightened strongly by means of the bar handle 28.

Next, the pipe end of the straight pipe f to be welded is placed end to end with the end portion of the straight pipe e so that a predetermined condition can be obtained.

When the pipe ends of the straight pipes e and f are arranged almost uniformly, the pipe supporting screw bars 22, 23 and 24 are turned to support the pipe f by the abutting bar portions 22c, 23c and 24c at the tip ends. Then the straight pipe f to be welded is securely supported by finely moving the pipe supporting screw bars 22, 23 and 24.

In this way, the straight pipe e and the straight pipe f which is to be welded to the pipe e are held by the holder 1 under the facing and grooved condition. In this state, the groove portion is welded at several spots by welding operators. Then, in a proper time thereafter, the bar handle 28 is turned to open the left arm member 8 and the right arm member 10 of the holder 1 so as to remove the pipe abutting members 6, 17 and 18 as well as the pipe supporting screw bars 22, 23 and 24 from the straight pipe e and the straight pipe f. Next, regular welding is carried out on the groove portion, and the welding operation is terminated.

In this case, since the ower end surface 6c at the pipe abutting portion 6b of the pipe abutting member 6 is formed to have an inverted V-shape, the lower end surface 6c is set favorably on the outer peripheral surface of the pipe e, and since the inner side surfaces 17a and 18a of the pipe abutting members 17 and 18 are formed into a curved surface, they conform excellently with the outer peripheral surface of the pipe.

Figure 10:
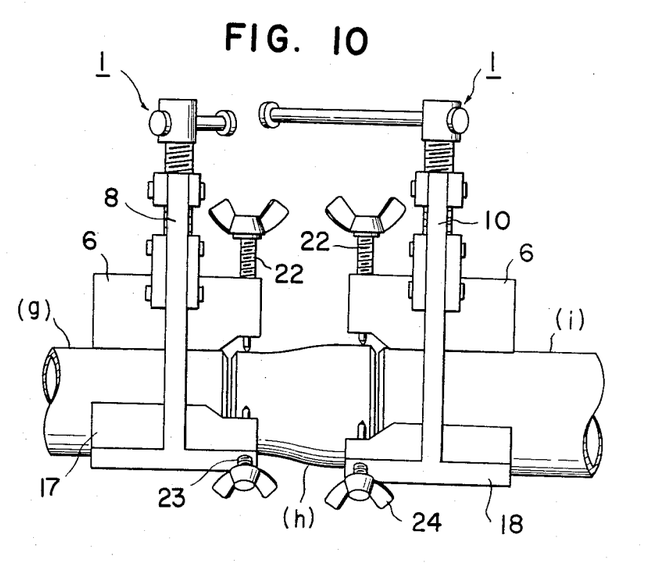
FIG. 10 is a view explaining a case wherein a small-diameter straight pipe, a reducer, and a large-diameter straight pipe are welded using two holders of this invention.

FIG. 10 shows an example wherein welding is prepared by using two holders 1, 1 of this invention when a straight pipe g having a small diameter, a reducer h, and a straight pipe i having a large diameter are to be welded together.

In one of the holder 1, the lower end surface 6c of the pipe abutting member 6, and the inner end surfaces 17a and 18a of the pipe abutting members 17 and 18 are caused to engage with the outer peripheral surface of the small diameter straight pipe g, and the small diameter end of the reducer h is held under a predetermined state by the abutting bar portions 22c, 23c and 24c of the pipe supporting screw bars 22, 23 and 24. While in the other holder 1, the lower end surface 6c of the pipe abutting member 6 and the inner end surfaces 17a and 18a of the pipe abutting members 17 and 18 are made to engage with the outer peripheral surface of the large diameter straight pipe i, while the large diameter side of the reducer h is supported by the abutting bar portions 22c, 23c and 24c of the pipe supporting screw bars 22, 23 and 24. In such a state, the groove portion is welded at several spots, two holders are removed, and the regular welding is proceeded.

Figure 11:
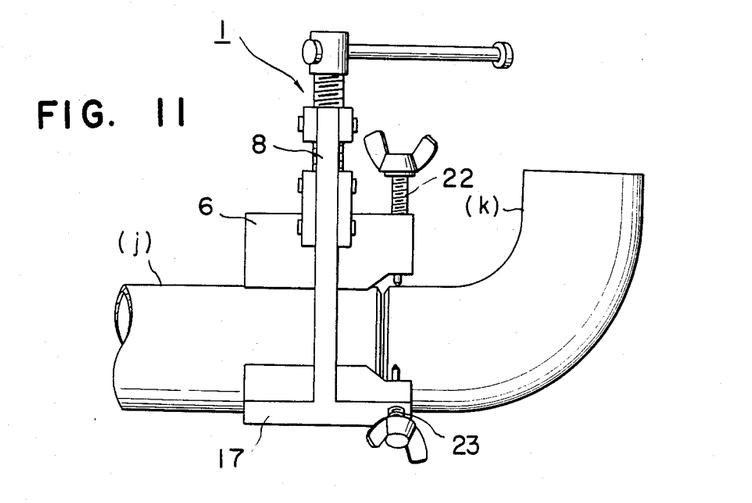
FIG. 11 is a view explaining a case wherein the holder according to the invention is used for welding a straight pipe and an elbow.

FIG. 11 shows a case wherein the holder 1 is utilized in welding a straight pipe j and an elbow k.

In this case, the elbow k is supported by its end portion by abutting the pipe abutting portions 6b, 17b and 18b of the pipe abutting members 6, 17 and 18 and by the abutting bar portions 22c, 23c and 24c of the pipe supporting screw bars 22, 23 and 24.

Figure 12:
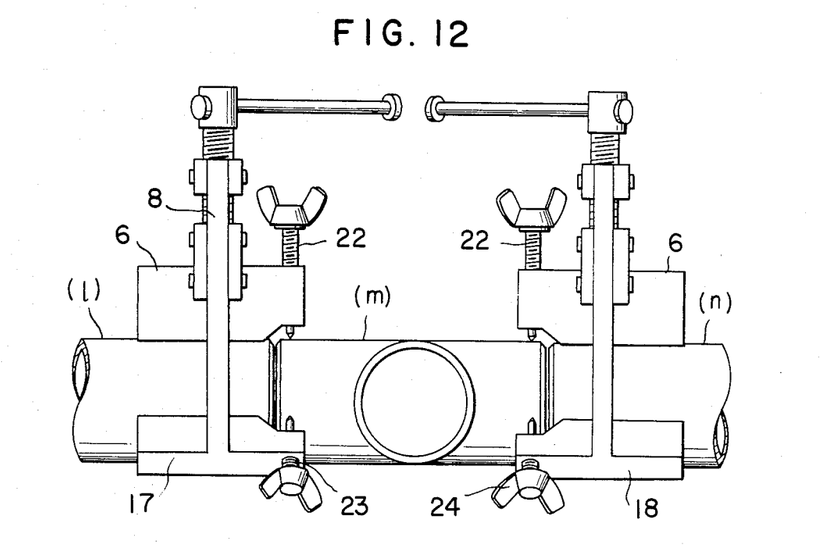
FIG. 12 is a view explaining a case wherein a straight pipe, a T-shaped pipe and a straight pipe are welded.

FIG. 12 shows a case where a straight pipe l, a T-shaped short pipe m and a straight pipe n are to be welded. In this case, both ends of the T-shaped pipe m are supported by pipe supporting screw bars 22, 23 and 24 of the holders 1, 1, respectively.

Figure 13:
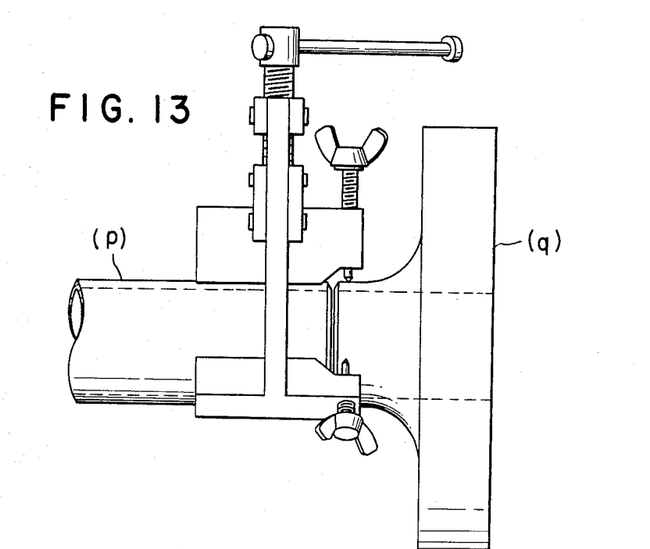
FIG. 13 is a view explaining a case wherein the holder of this invention is used for welding a straight pipe and a flanged pipe joint.

FIG. 13 shows a case where a straight pipe p and a flanged pipe joint q are to be welded. In this case, the pipe end of the flanged pipe joint q is supported by the pipe supporting screw bars 22, 23 and 24.

Figure 14:
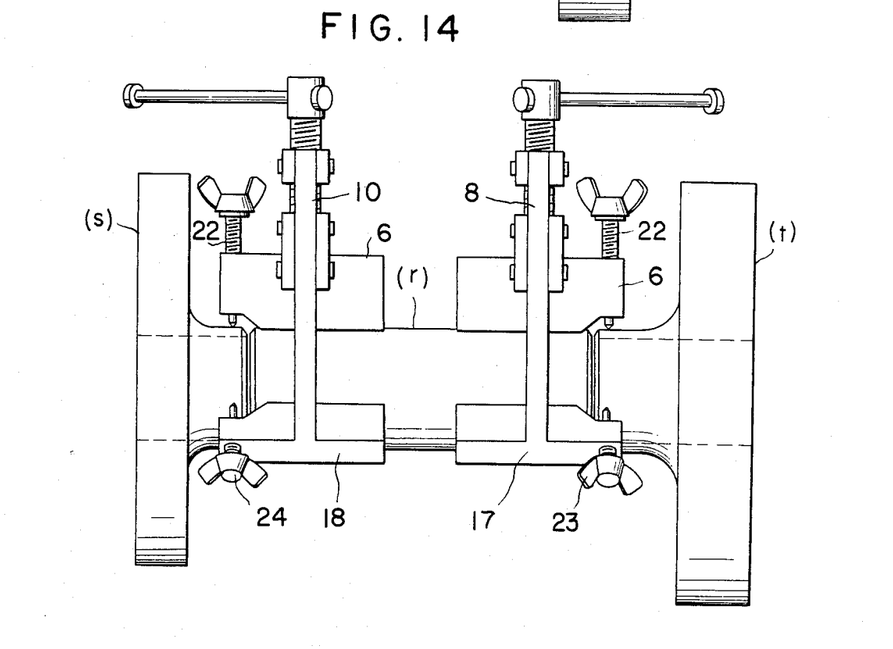
FIG. 14 is a view explaining a case wherein two flanged pipe joints are welded to both ends of a straight pipe using two holders of this invention.

FIG. 14 shows a case where two flanged pipe joints s and t are welded to both ends of a short pipe r, and in this case, two holders 1, 1 are used, and the flanged pipe joints s and t are supported by the pipe supporting screw bars 22, 23 and 24. In this case, phase positions of the pipe abutting members 6, 17 and 18 of the holders 1, 1 may be shifted.

By use of the holder according to the present invention, pipes can be assembled by holding the pipes or pipe joints successively without relying on skilled workers.

In addition, with the holder of this invention, the facing and holding of the groove portions of the respective pipes or the pipe-centering can be effected speedily.

The holder of this invention can be made of metals, plastics or a combination of metals and plastics, selected as desired. As for the pipe joints, elbows, reducers, T-shaped pipes, caps, bends, or the like can be mentioned.

With the use of holder according to this invention, preparatory fixing with provisional plates are omitted. Furthermore, piping and welding operations are remarkably improved, quality of welded portions are elevated, and welding operation of pipes and conduits can be carried out with high efficiency as a whole.

What is claimed is:

1. Holder for welding pipes or pipe joints comprising a supporting member having an upper surface and a lower surface with a threaded hole extending therethrough from the upper surface to the lower surface, said supporting member having a pair of opposite end portions, an upwardly arranged axially extending screw bar engaged within the threaded hole in said supporting member, a mounting member mounted at the lower end of said screw bar and the lower end of said screw bar projects downwardly from the lower surface of said supporting member, said mounting member having a pair of end portions, said mounting member being movable upwardly and downwardly by turning said screw bar about the axis thereof, a first pipe abutting member provided on said mounting member, an upwardly arranged first arm member having an upper portion and a lower portion and being pivoted at the upper end thereof to one end portion of said supporting member, an upwardly arranged second arm member having an upper portion and a lower portion and being pivoted at the upper end thereof to the other end portion of said supporting member, a first link having a pair of opposite ends with one end pivoted to one end portion of said mounting member and the other end pivoted to the upper portion of said first arm member, a second link having a pair of opposite ends with one end pivoted to the other end portion of said mounting member and the other end of said second link pivoted to the upper portion of said second arm member, a second pipe abutting member provided at the lower end of each of said first arm member and second arm member, each of said first and second pipe abutting members having a threaded hole extending therethrough, and a pipe supporting screw bar mounted in each said threaded hole in said first and second pipe abutting members.

2. Holder, as set forth in claim 1, wherein the extension of the axis of said screw bar engaged within the threaded hole in said said supporting member is located between said first and second arm members, each of said first and second arm members is curved inwardly toward the axis of said screw bar in said supporting member.

3. Holder, as set forth in claim 1, wherein said first arm member and said second arm member are pivotally displaceable in an upwardly extending plane, said first pipe abutting member and said second pipe abutting members being elongated in the direction extending perpendicularly to the plane in which said first and second arm members are pivotally displaceable.

4. Holder, as set forth in claim 3, wherein said pipe supporting screw bars mounted in said first and second pipe abutting members are equiangularly displaced apart in a plane generally parallel to the plane of the pivotal movement of said first and second arm members.

* * * * *